(12) United States Patent
Elliott

(10) Patent No.: US 6,385,978 B1
(45) Date of Patent: May 14, 2002

(54) METHOD AND APPARATUS FOR DRYING COMPRESSED AIR

(76) Inventor: Brian S. Elliott, 4518 Kinglet St., Houston, TX (US) 77035

(*) Notice: Subject to any disclaimer, the term of this patent is extended or adjusted under 35 U.S.C. 154(b) by 0 days.

(21) Appl. No.: 09/570,654

(22) Filed: May 15, 2000

Related U.S. Application Data

(60) Provisional application No. 60/133,959, filed on May 13, 1999, and provisional application No. 60/168,042, filed on Nov. 30, 1999.

(51) Int. Cl.[7] .............................................. F25D 17/06
(52) U.S. Cl. ........................................ 62/93; 165/111
(58) Field of Search ............................. 62/93, 81, 278, 62/272; 165/111; 95/288, 289

(56) References Cited

U.S. PATENT DOCUMENTS

| | | | |
|---|---|---|---|
| 3,359,753 A | * 12/1967 | Fiedler et al. | 62/317 |
| 3,734,174 A | * 5/1973 | Bloxham et al. | 165/154 |
| 4,242,110 A | * 12/1980 | Hynes | 55/269 |
| 4,555,912 A | * 12/1985 | Bogosh | 62/272 |
| 4,646,819 A | * 3/1987 | Pridham | 165/111 |

OTHER PUBLICATIONS

Compressed Air Dryers After Coolers Line Trap; Catalog Num. 2000A.

* cited by examiner

Primary Examiner—Denise L. Esquivel
Assistant Examiner—Melvin Jones
(74) Attorney, Agent, or Firm—Henry L. Ehrlich; Winstead Sechrest & Minick, P.C.

(57) ABSTRACT

A method and apparatus for reducing the moisture content of a gas stream is provided. The apparatus includes a shell having a least one tube disposed therein and a condensate trap attached to the shell. A gas stream inlet and outlet are provided so that the gas stream may flow through tubes or shell, and preferably through the tubes although it is contemplated to flow the gas stream through the shell side. The drying apparatus further includes a coolant and/or volatile fluid inlet and outlet to flow a fluid such as, but not limited to, water, alcohol, or acetone to cool the gas stream and condense moisture contained therein. The drying apparatus and method of the present invention may further include a vaporization unit for vaporizing the volatile fluid with a stream of gas such as air to form a cool vapor cloud to pass through the drying apparatus.

20 Claims, 5 Drawing Sheets

METHOD AND APPARATUS FOR DRYING COMPRESSED AIR

This application is a non-provisional application claiming priority to provisional application No. 60/133,959 filed on May 13, 1999 and provisional application No. 60/168,042 filed on Nov. 30, 1999, pursuant to 35 U.S.C. 119. Provisional applications Nos. 60/133,959 and 60/168,042 are included herein in there entirety by reference.

TECHNICAL FIELD

The present invention relates in general to methods and apparatus for removing excess moisture from air streams and in particular to a method and apparatus that removes excess moisture from compressed air streams through a unique cooling and condensation process.

BACKGROUND

Compressed air systems are utilized in a wide variety of applications and industries ranging from repair shops, construction sites, manufacturing, and dry cleaning facilities to home use. In areas where relative humidity is high, water build up in air lines can cause severe problems. Water in the air lines can shorten the life of air tools, clump media in sandblasting operations, ruin delicate parts during air jet cleaning processes, damage air driven components within machinery or produce inferior painted surfaces. Excessive water and water buildup in the air storage tanks corrodes and damages tanks prematurely.

There are a number of methods and devices on the market intended to remove free moisture from compressed air streams. There are two primary types of prior art dryers, refrigerant and media dryers. Refrigerant dryers commonly utilize are refrigerant such as fluorocarbons that are expensive and detrimental to the environment. Media type dryers typically include desiccants which must be replaced or regenerated periodically. The bulk of these prior art devices are very expensive, large, exhibit environmental concerns, and are maintenance intensive and operationally sensitive.

It would be a benefit therefore to have a method and apparatus which removes excess water from an air stream and that is easily installable in an air system. It would be a still further benefit to have a method and apparatus for removing excess moisture from an air stream that utilizes material which is readably available and environmentally safe. It would be a still further benefit to have a method and apparatus for removing excess moisture from an air stream that is inexpensive and relatively maintenance free.

GENERAL DESCRIPTION

Accordingly, a method and apparatus for reducing the moisture content of a gas stream is provided. The apparatus includes a shell having a least one tube disposed therein and a condensate trap attached to the shell. A gas stream inlet and outlet are provided so that the gas stream may flow through tubes or shell, and preferably through the tubes although it is contemplated to flow the gas stream through the shell side. The drying apparatus further includes a coolant and/or volatile fluid inlet and outlet to flow a fluid such as, but not limited to, water, alcohol, or acetone to cool the gas stream and condense moisture contained therein. The drying apparatus and method of the present invention may further include a vaporization unit for vaporizing the volatile fluid with a stream of gas such as air to form a cool vapor cloud to pass through the drying apparatus.

An apparatus for reducing the moisture content of a gas stream is provided that includes a shell and tube exchanger having a gas inlet and gas outlet, a coolant inlet and coolant outlet, a condensate trap, and a condensate drain, wherein the gas inlet is connectable within a gas stream whereby the gas stream is routed through the inlet, the tubes and discharged through the gas outlet; and a coolant transmitted through the coolant inlet, through the shell, and by the tubes and discharged through the coolant outlet. The coolant may be any type fluid and may be water which is available and most sites and may be a vapor. The gas stream may be formed of substantially any gas including air.

The drying apparatus may include a vaporization forming a mixing nozzle and connected to the coolant inlet. A source of coolant or volatile fluid such as, but not limited to, water, alcohol, or acetone connected to the fluid inlet in communication with the mixing nozzle, and a source of charged air passing through an air nozzle in connection with the mixing nozzle of the vaporization unit to form a cool vapor within the drying unit when the volatile fluid flash vaporizes. Additionally, micro-droplets may be formed in the vapor to aid in thermal coupling with the tubes to condense the moisture in the gas stream.

The foregoing has outlined the features and technical advantages of the present invention in order that the detailed description of the invention that follows may be better understood. Additional features and advantages of the invention will be described hereinafter which form the subject of the claims of the invention.

DETAILED DESCRIPTION

Figure 1:
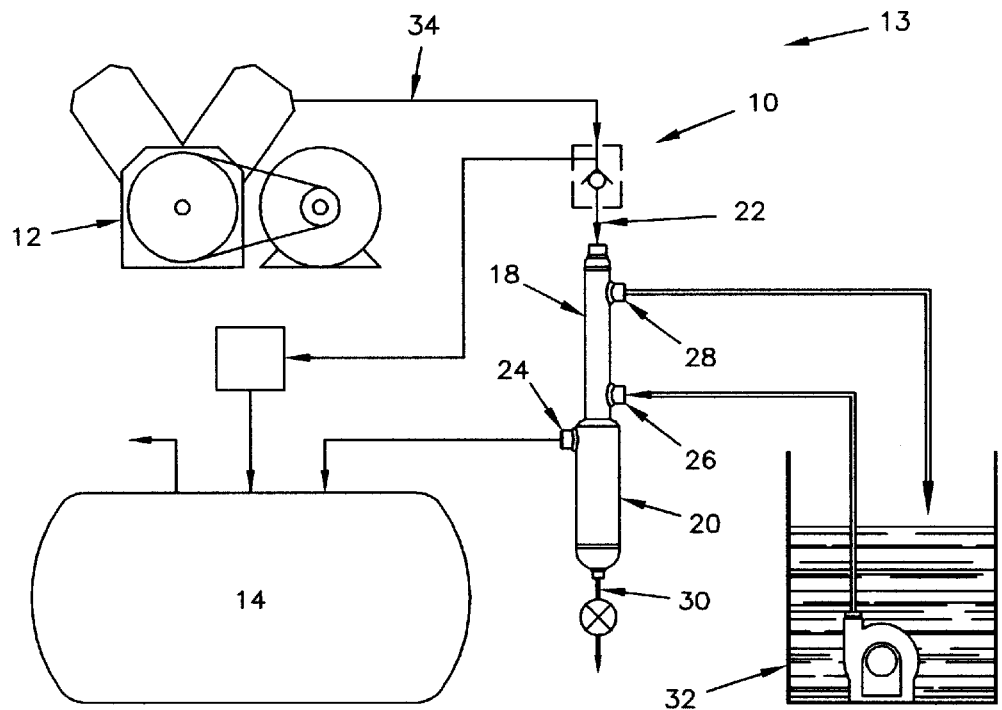
FIG. 1 is a schematic drawing of an embodiment of the compressed air drying system of the present invention.

Refer now to the drawings wherein depicted elements are not necessarily shown to scale and wherein like or similar elements are designated by the same reference numeral through the several views.

FIG. 1 is a schematic drawing of a preferred embodiment of a compressed air drying system 13 including an air dryer 10 of the present invention. Compressed air system 13 includes a compressor 12, a compressed air reservoir tank 14, and air dryer unit 10.

Compressed air system 13 as shown is a common air compressor found in gas stations, homes, at construction sites, and in manufacturing facilities. Compressor 12 mechanically pressurizes air which is then transmitted to tank 14 or directly to a tool for operation. Tank 14 is not necessary although a common and beneficial part of the compressed air system. Typically in a compressed air system moisture will be contained in the air stream which is pressurized resulting in damage to tools and equipment associated with the system. To alleviate the problems with moisture in the compressed air it is desired to dry the air. The present invention includes an air dryer 10 which may be connected within an existing air compressor system or constructed as a unitary part of an air compressor system.

Air dryer 10 includes a shell and tube heat exchanger 18 having a condensate trap 20, an air inlet 22, a dry air outlet 24, a coolant inlet 26, a coolant outlet 28, and a drain 30. Air dryer 10 is in fluid connection between compressor 12 and tank 14 or operating tools such as a pneumatic wrench or sand blaster. Air dryer 10 is further in operational connection with a coolant source 32 such as a reservoir containing water or a mixture of fluid such as, but not limited to, water and ethylene glycol.

As shown in FIG. 1, compressed air which is heated during the compression phase is transmitted into air dryer 10 at inlet 22 and exits dryer 10 at outlet 24 to tank 14 or an tool for operation. A coolant, such as water, is circulated from reservoir 32 through coolant inlet 26, through shell and tube exchanger 18 and discharged from coolant outlet 28 back to reservoir 32 or an appropriate disposal site. As compressed air and coolant pass through air dryer 10 excess moisture is condensed from the compressed air, collected in trap 20 for discharge through drain 30.

Figure 2:
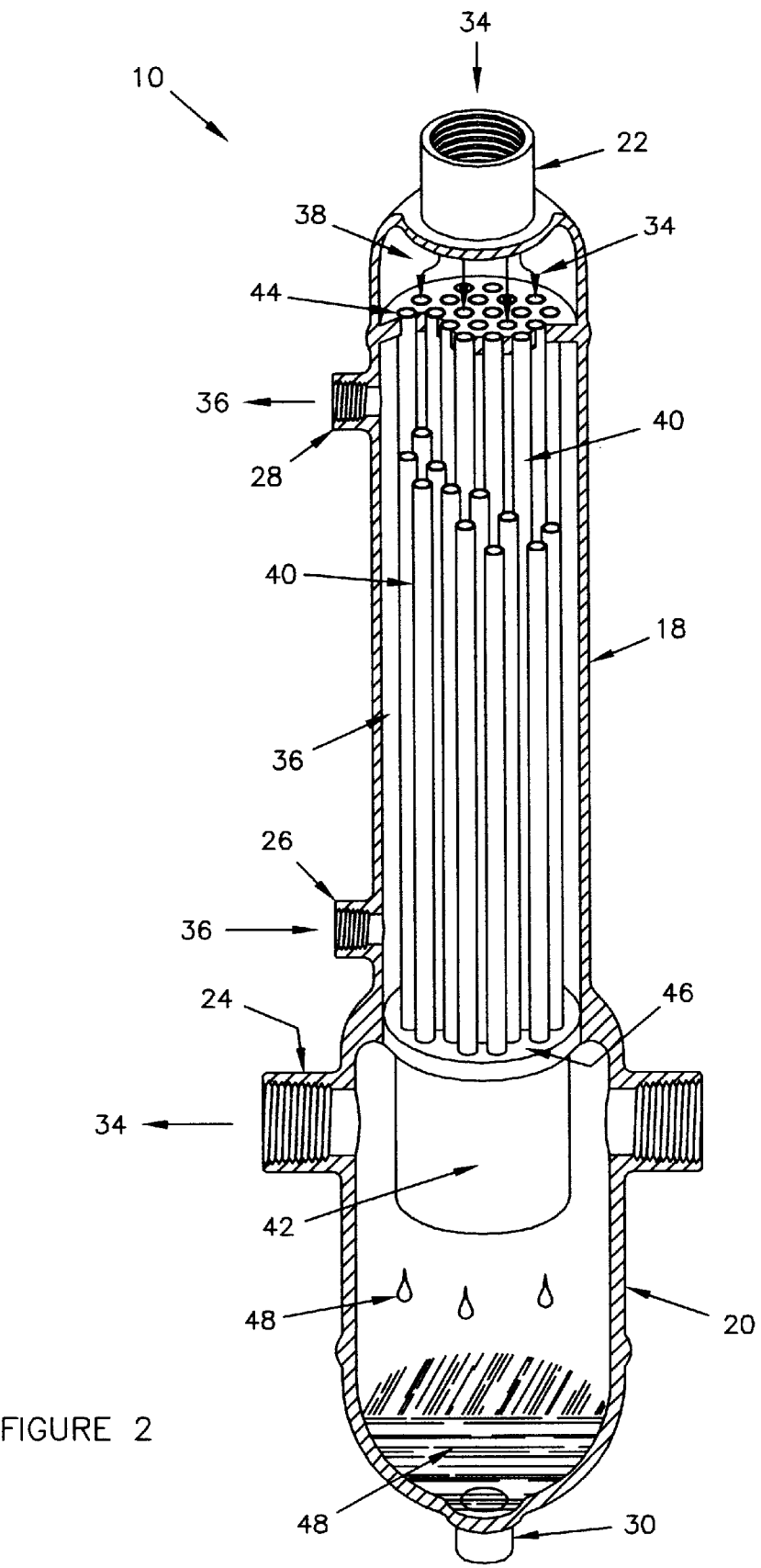
FIG. 2 is a partial cross-sectional view of a shell and tube exchanger of the present invention.

FIG. 2 is a partial cross-sectional view of shell and tube exchanger 18 of the present invention. Tube and shell exchanger 18 includes a plenum 38, tubes 40 which are connected between an upper tube plate 44 and a lower tube plate 46, and condensate trap 20. A baffle 42 may be included adjacent the exit ends of tubes 40 to prevent condensate 48 from exiting outlet 24 with dried compressed air 34.

With reference to FIGS. 1 and 2, compressed air 34, heated and laden with moisture, is discharged from compressor 12 and transmitted to air dryer 10 via inlet 22. Compressed air 34 enters tubes 40 at plenum 38 and passes through tubes 40 into condensate trap 20 where it exits at outlet 24 and is transmitted to tank 14 or to tools. Coolant 36, such as water, enters dryer 10 through inlet 26 and passes through shell and tube exchanger 18 on the shell side passing across tubes 40 and exits outlet 28. As coolant 36 passes across tubes 40 through which compressed air 34 is passing heat is transferred from air 34 to coolant 36 condensing moisture out of air 34. The condensate 48 drops into trap 20 where it can be drained at intervals.

Figure 3:
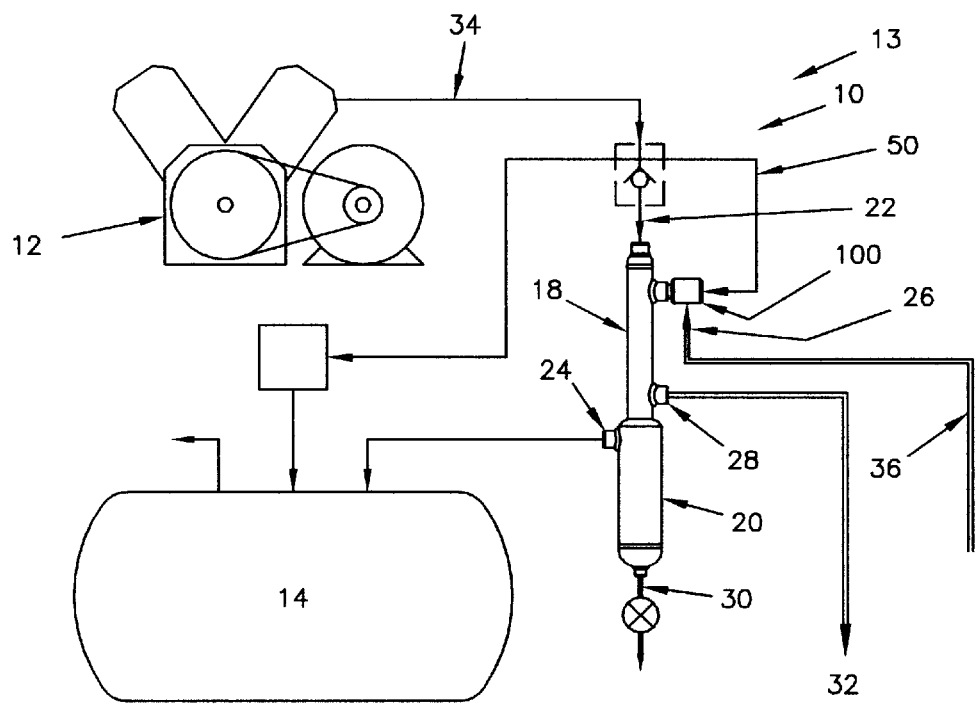
FIG. 3 is a schematic drawing of another embodiment of the compressed air drying system of the present invention.

FIG. 3 is a schematic drawing of another embodiment of the compressed air drying system of the present invention. Air dryer 13 as shown in FIG. 3 further includes a vaporization cooling unit 100. Compressed air 34 is transmitted through air inlet 22 into shell and tube exchanger 18 and exits air outlet 24 for transmission to tank 14 or tools. Coolant 36, which maybe water from a water tap 32 or other fluids such as acetone, alcohol or the like, is introduced into shell and tube exchanger 18 through inlet 26 via vaporization cooler 100. Additionally, pressurized charge air 50 is introduced into vaporization unit 100 with coolant 36. In this embodiment charge air 50 is transmitted from tank 14 to vaporization unit 100, although other sources of charge air 50 may be utilized.

Figure 4:
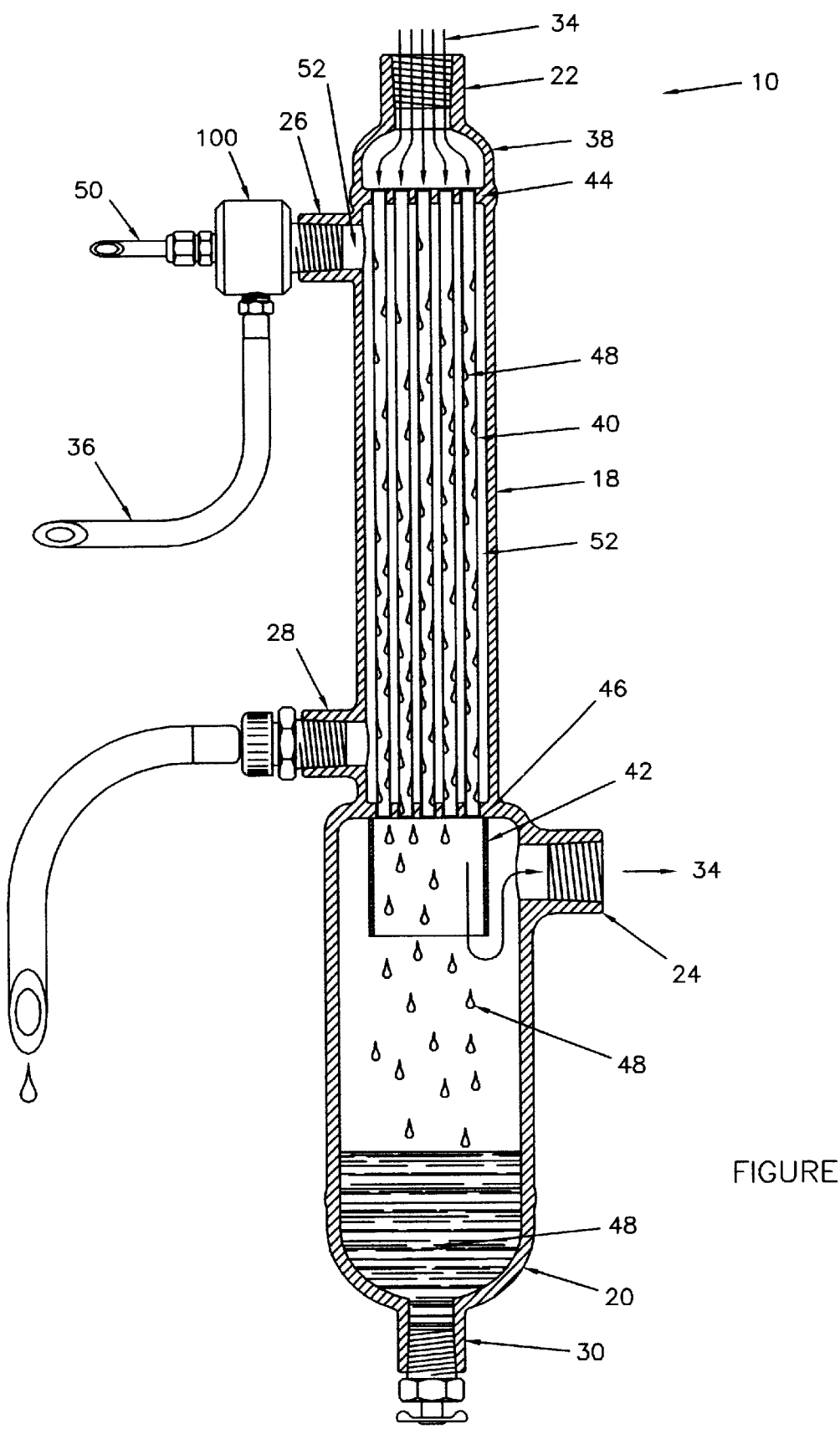
FIG. 4 is a partial cross-sectional view of the air dryer shown in FIG. 1.

FIG. 4 is a partial cross-sectional view of air dryer 10 as shown in FIG. 3. Compressed, moist air 34 is introduced to shell and tube exchanger 18 through inlet 22, passing through tubes 40 and exits outlet 24 after releasing condensate 48. Water is condensed from air 34 by passing a cooled vapor cloud 52 through the shell side of exchanger 18 so as to cool air 34 in tubes 40 forming a condensate. Cooled vapor cloud 52 is formed by mixing a coolant 36 such as water in a liquid form with charge air 50 in vapor unit 100. Vapor cloud 52 enters exchanger 18 at coolant inlet 26 and passes over tubes 40 exiting at coolant outlet 28. One of the benefits of the present invention is the ability to dispose of coolant 36 in a environmentally safe manner without any treatment of the exiting coolant.

Figure 5:
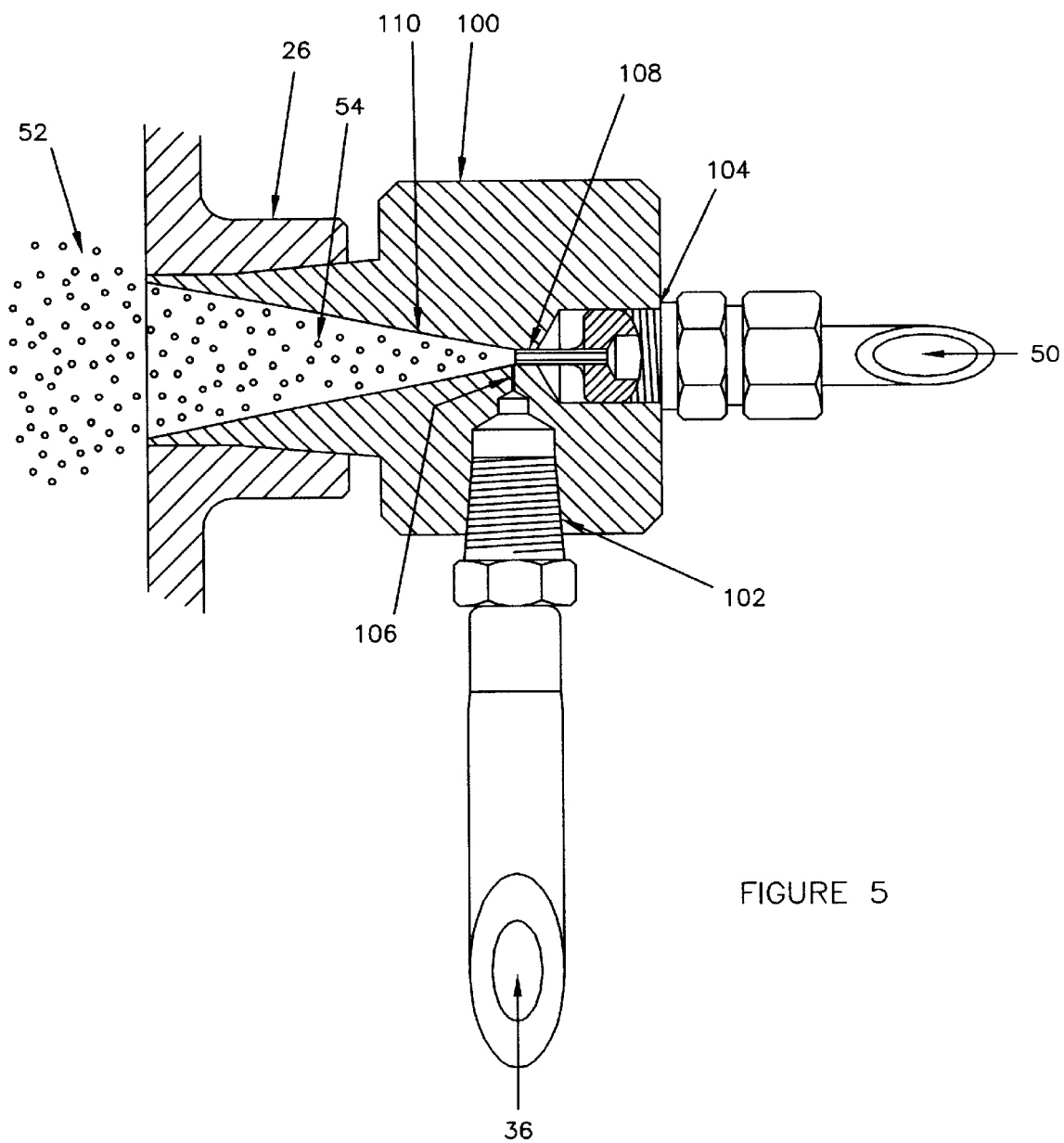
FIG. 5 is a partial cross-sectional view of an embodiment of the vaporization cooling unit of the present invention.

FIG. 5 is a partial cross-sectional view of an embodiment of vaporization cooling unit 100 of the present invention. Vaporization cooling unit 100 includes a mixing nozzle 110 formed therein and a fluid inlet 102 and fluid nozzle 106, and a charged air inlet 104 and charged air nozzle 108 all in operational communication with mixing nozzle 100. Vaporization cooling unit 100 is connected to coolant inlet 26 at the larger diameter end of mixing nozzle 110. Charged air 50 line is connected to charged air inlet 104 with charged air nozzle 108 in fluid communication with mixing nozzle 110. A fluid 36 line is connected to fluid inlet 102 with fluid nozzle 106 in fluid communication with mixing nozzle 110.

A method of utilizing air dryer 10 and vaporization unit 100 of FIG. 3 is described with reference to FIGS. 3 through 5. A volatile fluid 36, such as water, is introduced to refrigerator 100 via a volatile fluid feed hose, volatile fluid feed port 102, and a volatile fluid nozzle 106. Charged air 50 is introduced to refrigerator 100 via an air feed line, air feed port 104, and air nozzle 108. Volatile fluid 36 is flash vaporized as it is introduced into the air stream via the vacuum created by a venturi effect. Volatile fluid feed 36 is sufficient to allow micro-droplets 54 to form in the cloud discharge 52. The droplets 54 adopt the same temperature as the cloud discharge 52 and assure good thermal coupling to the heat exchanger tubes 40. The expansion of cloud discharge 52 is controlled via an expansion cone 110 formed in refrigerator body 100.

Figure 6:
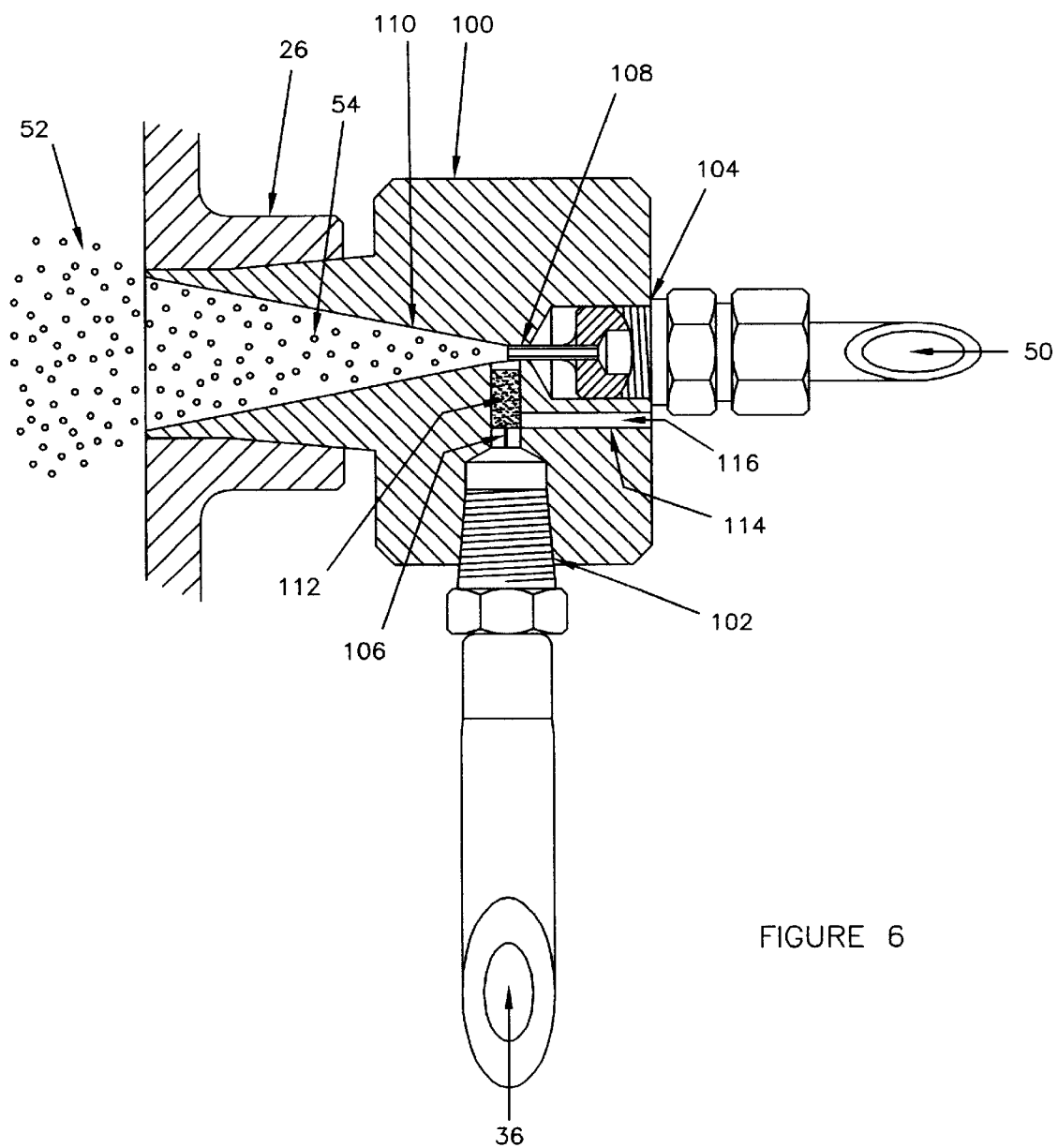
FIG. 6 is a partial cross-sectional view of another embodiment of the vaporization cooling unit of the present invention.

FIG. 6 is a partial cross-sectional view of another embodiment of vaporization cooling unit 100 of the present invention. FIG. 6 is a vaporization cooling unit 100 similar to that as shown in FIG. 5 further including an emulsification cavity 112 and cover air port 114. Emulsification cavity 112 is formed by unit 10 so as to be in fluid communication between mixing nozzle 110 and fluid inlet and fluid nozzle 106. Cover air port 114 is a conduit formed between emulsification cavity 112 and an exterior of unit 100 to allow cover air 116 to enter cavity 112.

A method of utilizing unit 100 as shown in FIG. 6 is described with reference to FIGS. 3 through 6. Volatile fluid 36 is introduced into refrigerator 100 via a volatile fluid 36 line, volatile fluid feed port 102, and volatile fluid nozzle 106. Charged air 50 is introduced to refrigerator 100 via an air feed line, air feed port 104, and air nozzle 108. Cover air 116 and volatile fluid 36 are drawn up through the emulsification cavity 112 via the vacuum created by a venturi effect. Cover air 116 is drawn through cover air port 114. As volatile fluid 36 and cover air 116 are drawn through the emulsification cavity 112 volatile fluid 36 is emulsified. The emulsified volatile fluid is flash vaporized as it is introduced into air stream 50 via the vacuum created by a venturi effect. The volatile fluid feed 36 is sufficient to allow microdroplets 54 to form in the cloud discharge 52. The droplets 54 adopt the same temperature as the evaporated cloud discharge 52 and assure good thermal coupling to the heat exchanger tubes 40. The expansion of the cloud discharge 52 is controlled via an expansion cone 110 incorporated into refrigerator body 100.

EXAMPLE: With reference to FIGS. 3 through 6, utilizing seven 23.5 inch, 0.25 inch outside diameter tubes having a wall thickness of 0.35 inches, in a 1.25" schedule 40 shell in conjunction with a five and ten horsepower compressors.

Charge air 50 is introduced into air nozzle 108 at pressure of 120 PSI. Air nozzle 108 will dictate a flow rate of 1.2 CFM@120 PSI. The discharge of air nozzle 108 is approximate the small end of the 20° cone 110. The air enters the 20° cone 110 and expands at a controlled rate until the pressure has dropped to atmospheric pressure @10.2 CFM. Water 36 is introduced into a 0.015 inch nozzle 106 at a pressure of 40 PSI. Fluid nozzle 106 will dictate a flow rate of 0.07 GPM. Fluid nozzle 106 is positioned to introduce the water flow into the air stream. As the water comes in contact with the air stream, it is atomized and flash vaporized forming a 35° F. vapor cloud 52. The water flow is sufficient to produce a saturated cloud and micro-droplets of water 54. The droplets 54 adopt the same temperature as the vapor cloud 52 and aid the thermal coupling to the heat exchanger tubes 40.

Compressed air 34 with a temperature between 35° and 450° F., relative humidity between 20% and 100%, pressure between 35 and 250 PSI, and a flow rate between 5 and 17 CFM is introduced to exchanger 18 and through tubes 40. The outside of the exchanger tubes 140 are cooled to 35° F. by the refrigerated vapor cloud 52 and, in turn, the air inside of the exchanger tubes is cooled to 38° F. As the air is cooled, water vapor is condensed and forms droplets 38 on the inside wall of the exchanger tubes 40. These droplets 38 run down the exchanger tubes 40 and drip into condensate trap 20. The dry air 34 flows around the bottom of the aspiration baffle 42 and is discharged through outlet 24. The dripping condensate 38 is captured in condensate trap 20 and must be periodically drained. The cooled cloud 52 is discharged through the discharge port 28. The discharge may be in the form of a vapor cloud and/or liquid.

Although the present invention and its advantages have been described in detail, it should be understood that various changes, substitutions and alterations can be made wherein, such as drying a gas stream other than compressed or utilizing fluids such as but not limited to water, alcohol, and acetone without departing from the spirit and scope of the invention as defined by the appended claims.

What is claimed is:

1. A method of drying a stream of gas comprising the steps of:
    passing a stream of gas having moisture contained therein through at least one tube contained within a shell;
    passing a coolant through said shell across at least one said tube whereby said gas stream is cooled;
    condensing a portion of said moisture in said gas stream;
    discharging said gas stream less said condensate; and
    collecting said condensate for drainage.
2. The method of claim 1, wherein said coolant is water.
3. The method of claim 1, wherein said coolant is includes a water vapor.
4. The method of claim 3, wherein said water vapor includes micro-droplets.
5. An apparatus for reducing the moisture content of a gas stream, said apparatus comprising:
    a shell and tube exchanger having a gas inlet and gas outlet, a coolant inlet and coolant outlet, a condensate trap, and a condensate drain, wherein said gas inlet is connectable within a gas stream whereby said gas stream is routed through said inlet and at least one tube and discharged through said gas outlet; and
    coolant transmitted through said coolant inlet, through said shell and by at least one said tube and discharged through said coolant outlet.
6. The apparatus of claim 5, wherein said coolant is water.
7. The apparatus of claim 5, wherein said gas stream is air.
8. The apparatus of claim 5, wherein:
    said coolant is water; and
    said gas stream is air.
9. The apparatus of claim 8, wherein said water is substantially a water vapor.
10. The apparatus of claim 5, further including:
    a vaporization unit forming a mixing nozzle therein connected to said coolant inlet;
    a source of charge air having a charge air nozzle connected to said vaporization unit and in fluid communication with said mixing nozzle; and
    a source of coolant having a fluid nozzle connected to said fluid inlet in fluid communication with said mixing nozzle;
        wherein said coolant mixes with said charge air in said mixing nozzle and is flash vaporized to form a vapor cloud discharged into said shell and tube exchanger.
11. The apparatus of claim 10, wherein said coolant is substantially water.
12. The apparatus of claim 10, wherein said vapor cloud includes micro-droplets.
13. The apparatus of claim 11, wherein said vapor cloud includes micro-droplets.
14. The apparatus of claim 10, further including:
    an emulsification cavity formed by said vaporization unit and in fluid connection with the exterior of said unit via a cover air conduit, wherein said coolant nozzle is in fluid communication with said emulsification cavity.
15. The apparatus of claim 14, wherein said vapor cloud includes micro-droplets.
16. A method of drying a stream of gas comprising the steps of:
    passing a stream of gas having moisture contained therein through at least one tube contained within a shell;
    introducing a volatile fluid to said shell through a vaporization unit connected to said shell, said vaporization unit having a mixing nozzle formed therein;
    introducing a cover gas to said mixing nozzle with said fluid;
    vaporizing a substantial portion of said fluid into said shell;
    passing said vapor through said shell and by said tube; and
    condensing a portion of said moisture in said gas stream.
17. The method of claim 16, wherein said vapor includes micro-droplets of fluid.
18. The method of claim 17, wherein said gas stream is air and said fluid is substantially water.
19. The method of claim 16, wherein:
    said vaporization unit includes a emulsification cavity in fluid communication with said mixing nozzle, said volatile fluid nozzle, and exterior said unit via a cover air conduit.
20. The method of claim 19, wherein said vapor includes micro-droplets.

\* \* \* \* \*